(12) United States Patent  (10) Patent No.: US 9,407,814 B2
Pajak et al.  (45) Date of Patent: Aug. 2, 2016

(54) APPROACH FOR CAMERA CONTROL

(71) Applicant: NVIDIA CORPORATION, Santa Clara, CA (US)

(72) Inventors: Dawid Stanislaw Pajak, San Jose, CA (US); Jongmin Baek, Cupertino, CA (US); Kari Pulli, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/782,817

(22) Filed: Mar. 1, 2013

(65) Prior Publication Data
US 2014/0176750 A1  Jun. 26, 2014

Related U.S. Application Data

(60) Provisional application No. 61/745,198, filed on Dec. 21, 2012.

(51) Int. Cl.
  *H04N 5/262* (2006.01)
  *H04N 5/222* (2006.01)
  *H04N 5/232* (2006.01)
  *H04N 5/225* (2006.01)
(52) U.S. Cl.
  CPC .......... *H04N 5/23216* (2013.01); *H04N 5/225* (2013.01); *H04N 5/23293* (2013.01); *H04N 5/2621* (2013.01)
(58) Field of Classification Search
  None
  See application file for complete search history.

(56) References Cited

U.S. PATENT DOCUMENTS

| 2005/0104900 A1* | 5/2005 | Toyama et al. ............... 345/629 |
| 2007/0047834 A1* | 3/2007 | Connell ......................... 382/274 |
| 2009/0225201 A1* | 9/2009 | Abe et al. ...................... 348/241 |
| 2010/0110104 A1 | 5/2010 | Hertzfeld et al. |
| 2010/0141784 A1* | 6/2010 | Yoo ............................. 348/222.1 |
| 2011/0227950 A1 | 9/2011 | Suzuki |
| 2012/0014562 A1* | 1/2012 | Berkovich et al. ............ 382/103 |
| 2013/0088618 A1* | 4/2013 | Kunishige et al. ............ 348/239 |
| 2013/0162876 A1* | 6/2013 | Song et al. ............... 348/333.01 |
| 2013/0308197 A1* | 11/2013 | Duparre ........................ 359/621 |
| 2013/0329001 A1* | 12/2013 | Tico et al. ...................... 348/36 |

FOREIGN PATENT DOCUMENTS

CN  101253764 A  8/2008
CN  102196185 A  9/2011

OTHER PUBLICATIONS

Non-Final Office Action for U.S. Appl. No. 13/782,863, dated May 6, 2014.

* cited by examiner

*Primary Examiner* — Aung S Moe
*Assistant Examiner* — Euel Cowan
(74) *Attorney, Agent, or Firm* — Artegis Law Group, LLP

(57) ABSTRACT

An approach is provided for performing back-end operations for camera control. In one example, a method includes the following: receiving a user edit via a user interface device that displays an interpretation of a scene at which a camera lens of the camera is pointing, wherein the user edit is based on user input that is associated with a selection region on the user interface device; generating an edits mask based on one or more matching image patches, which are based on the user edit and a high dynamic range (HDR) image generated by the camera; performing one or more tone mapping operations based on the edits mask and the HDR image in order to generate a tone mapped HDR image; and performing one or more metering operations based on the edits mask and the tone mapped HDR image in order to generate metering parameters for frame capturing operations.

22 Claims, 10 Drawing Sheets

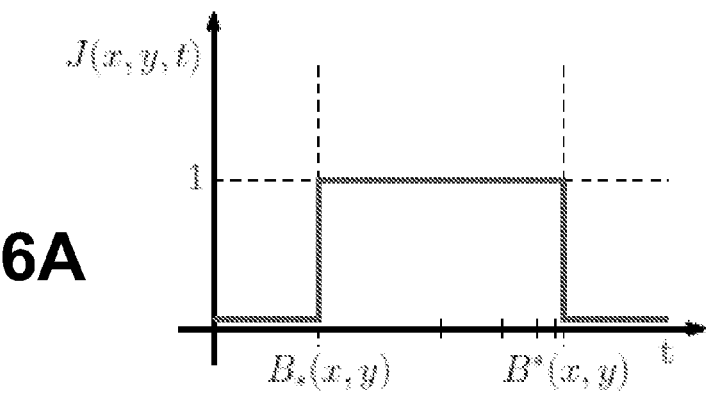
Case a: $P(x, y)$ *is not saturated.*
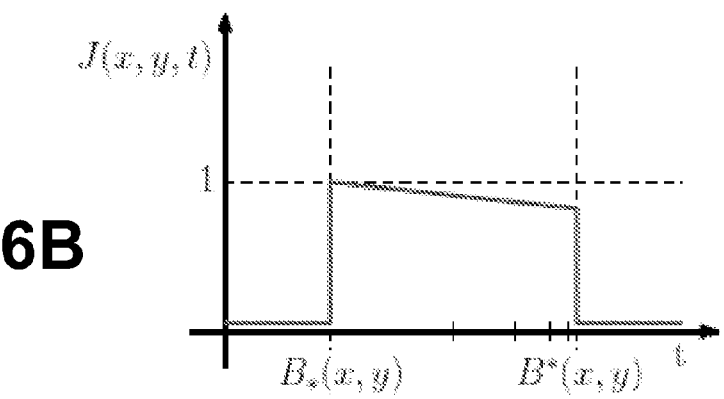
Case b: $P(x, y)$ *is saturated.*
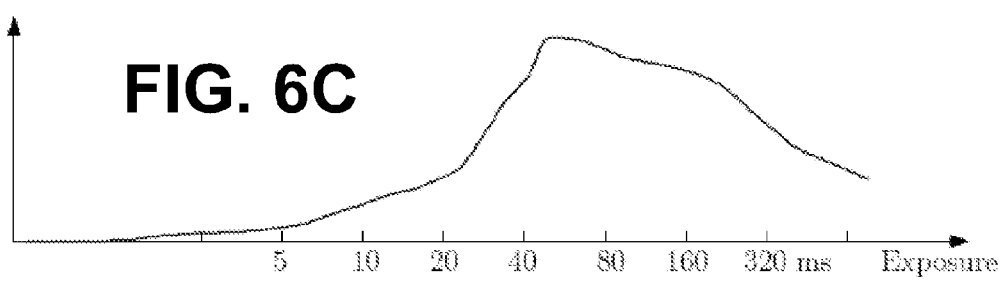
(c) *The aggregated objective for a scene under a tonemapping operator.*

APPROACH FOR CAMERA CONTROL

CROSS-REFERENCE TO RELATED APPLICATIONS

This application claims benefit of U.S. provisional patent application Ser. No. 61/745,198, filed Dec. 21, 2012, which is hereby incorporated herein by reference.

BACKGROUND OF THE INVENTION

1. Field of the Invention

The present invention relates generally to camera capture and, more specifically, to an approach for camera control.

2. Description of the Related Art

Mobile devices having a digital camera, a display, an adequate computational power, and a touch interface are becoming increasingly commonplace, and increasingly powerful. More photographs are captured by mobile devices now than ever, and many of them are edited directly on device and shared directly from that device, without ever even being uploaded to PCs. This phenomenon is well-reflected in the recent focus on camera control and image processing on mobile platforms and also in the popularity of photography apps on smart phones.

A typical digital camera, whether a feature-rich digital single lens reflex (DSLR) or a point-and-shoot device, relies on a set of knobs and buttons to control capture parameters. In a standalone photographic pipeline, the user selects a pre-defined shooting mode that specifies the camera metering strategy (e.g., daylight, night-mode, spot-mode, panorama, macro-photography, etc.), captures an image while potentially adjusting capture parameters with sliders or dials. Then, as an optional post-processing step, the user performs edits to correct for undesired metering settings (e.g., picture or specific regions are over/under-exposed, add synthetic blur to background to emphasize foreground, etc.). This approach, resulting from almost a century of photography evolution, is effective but poses some difficulties for inexperienced camera users. Point-and-shoot cameras tend to produce sub-optimal images due to primitive metering strategies that do not reflect user's intentions, while DSLR are difficult to operate without in-depth knowledge of photography. On top of that, a direct port of knob and buttons interface does not fully utilize the potential of the touch-based interface available on many mobile devices.

Early photographers could not directly see the results as they were taking photos, but had to imagine the results as a function of various imaging parameters such as exposure, focus, even choice of film and paper that were used. Digital cameras with real-time digital displays that show a preview image have made photography much easier in this respect. Framing the image and choosing the timing of capture is made easier and more fun as the camera gives a preview of what the captured image will look like. However, when using many computational photography techniques the user still needs to imagine the result of, for example, combining an exposure burst into a high dynamic range (HDR) image and tone-mapping the HDR image back to low dynamic range (LDR) for display, rather than seeing an approximation of the end result in a digital viewfinder. Similar limitations apply also to traditional digital photography. Many photographers edit their photographs after capture, using tools such as Photoshop or Lightroom. Unfortunately, users must capture the shot in the field before knowing the effect such later edits might have on the result. The capture process thus remains separated from the image editing process, potentially leading to inadequate data acquisition (e.g., wrong composition or insufficient signal-to-noise ratio (SNR)) or excessive data acquisition (e.g., longer capture time, exacerbated handshake or motion blur, and increased cost of storage or transmission.)

Accordingly, typical digital cameras provide a digital viewfinder with a somewhat faithful depiction of the final image. If, however, the image is created from a burst of differently captured images, or non-linear interactive edits have a significant contribution to the final outcome, the photographer cannot directly see the results, but needs to imagine the post-processing effects.

Accordingly, what is needed is a camera that enables capturing a scene that more accurately represents the user's intent at the moment of actuating the shutter.

SUMMARY OF THE INVENTION

One implementation of the present approach includes a method for performing back-end operations for control of a camera. In one example, the method includes the following: receiving a user edit via a user interface device that displays an interpretation of a scene at which a camera lens of the camera is pointing, wherein the user edit is based on user input that is associated with a selection region on the user interface device; generating an edits mask based on one or more matching image patches, which are based on the user edit and a high dynamic range (HDR) image generated by the camera; performing one or more tone mapping operations based on the edits mask and the HDR image in order to generate a tone mapped HDR image; and performing one or more metering operations based on the edits mask and the tone mapped HDR image in order to generate metering parameters for frame capturing operations.

The present approach provides at least two advantages over conventional approaches. One advantage is that the camera control system enables the user to make better decisions regarding image composition, since the camera control system enables the user to be aware of how the user's pending edits will affect the image that is captured at the moment the shutter is actuated. The viewfinder serves as a pre-visualization tool in this regard, providing an enhanced user experience. Another advantage is that the camera control system carries out routines that better utilize the capture parameters, such as focus, exposure, gain, white balance, and so on.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A is a diagram illustrating a case (a) of an edit-based metering via per-pixel analysis, according to one embodiment of the present invention.

FIG. 6B is a diagram illustrating a case (b) of an edit-based metering via per-pixel analysis, according to one embodiment of the present invention.

FIG. 6C is a diagram illustrating an aggregation of per-pixel objectives, according to one embodiment of the present invention.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Among other things, embodiments of the present invention are directed towards camera control, including a new class of algorithms for determining camera capture parameters (auto-focus, auto-exposure, auto-white-balance, etc.). Existing camera systems rely on sliders, dials and heuristic algorithms to adjust parameters. Such an approach, though functional, is sub-optimal for touch-based user interfaces and supports only global changes to the viewfinder stream. Embodiments of the present invention, on the other hand, enable for spatially localized metering and enable the user to compose the look and feel of the photograph through a set of edits applied directly on the viewfinder image. The underlying optimization framework ensures that the real-time execution of camera processing fulfill both user-defined appearance and image quality constraints.

Hardware Overview

Figure 1:
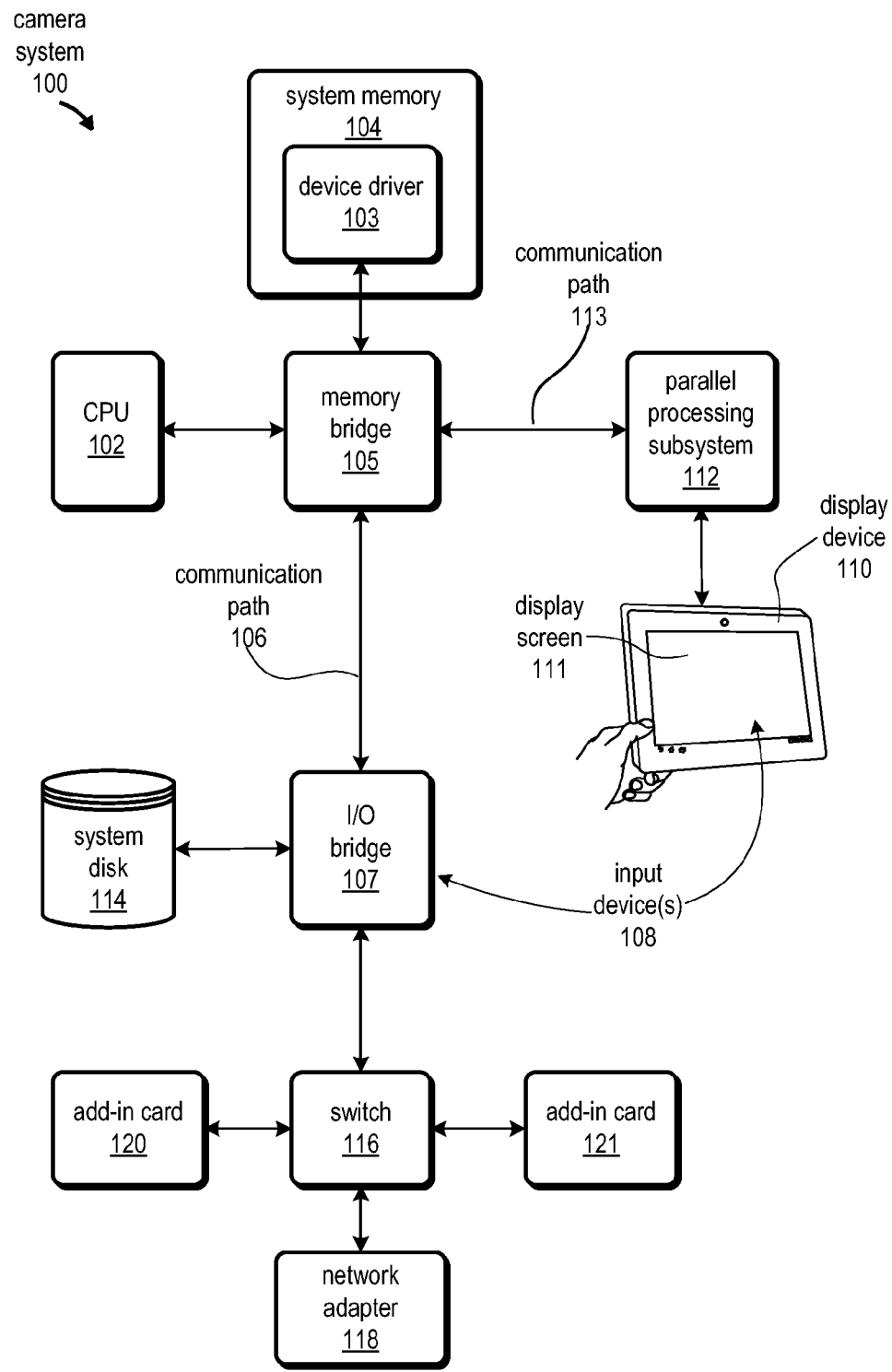
FIG. 1 is a block diagram illustrating a camera system configured to implement one or more aspects of the present invention.

FIG. 1 is a block diagram illustrating a camera system 100 configured to implement one or more aspects of the present invention. FIG. 1 in no way limits or is intended to limit the scope of the present invention. System 100 may be a digital camera, tablet computer, laptop computer, smart phone, mobile phone, mobile device, personal digital assistant, personal computer or any other device suitable for practicing one or more embodiments of the present invention. A device is hardware or a combination of hardware and software. A component is typically a part of a device and is hardware or a combination of hardware and software.

Camera system 100 includes a central processing unit (CPU) 102 and a system memory 104 that includes a device driver 103. CPU 102 and system memory 104 communicate via an interconnection path that may include a memory bridge 105. Memory bridge 105, which may be, for example, a Northbridge chip, is connected via a bus or other communication path 106 (e.g., a HyperTransport link, etc.) to an input/output (I/O) bridge 107. I/O bridge 107, which may be, for example, a Southbridge chip, receives user input from one or more user input devices 108 (e.g., touch screen, cursor pad, keyboard, mouse, etc.) and forwards the input to CPU 102 via path 106 and memory bridge 105. A parallel processing subsystem 112 is coupled to memory bridge 105 via a bus or other communication path 113 (e.g., peripheral component interconnect (PCI) express, Accelerated Graphics Port (AGP), and/or HyperTransport link, etc.). In one implementation, parallel processing subsystem 112 is a graphics subsystem that delivers pixels to a display device 110 (e.g., a conventional cathode ray tube (CRT) and/or liquid crystal display (LCD) based monitor, etc.). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) and/or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, and/or any other bus or point-to-point communication protocol(s), and connections between different devices that may use different protocols as is known in the art.

As further described below with reference to FIGS. 2-5, parallel processing subsystem 112 includes parallel processing units (PPUs) configured to execute a software application (e.g., device driver 103) by using circuitry that enables camera control. Those packet types are specified by the communication protocol used by communication path 113. In situations where a new packet type is introduced into the communication protocol (e.g., due to an enhancement to the communication protocol), parallel processing subsystem 112 can be configured to generate packets based on the new packet type and to exchange data with CPU 102 (or other processing units) across communication path 113 using the new packet type.

In one implementation, the parallel processing subsystem 112 incorporates circuitry optimized for graphics and video processing, including, for example, video output circuitry, and constitutes a graphics processing unit (GPU). In another implementation, the parallel processing subsystem 112 incorporates circuitry optimized for general purpose processing, while preserving the underlying computational architecture, described in greater detail herein. In yet another implementation, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some implementations, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other implementations, I/O bridge 107 and memory bridge 105 might be integrated into a single chip. Large implementations may include two or more CPUs 102 and two or more parallel processing systems 112. The particular components shown herein are optional; for instance, any number of add-in cards or peripheral devices might be supported. In some implementations, switch 116 is eliminated, and network adapter 118 and add-in cards 120, 121 connect directly to I/O bridge 107.

Figure 2:
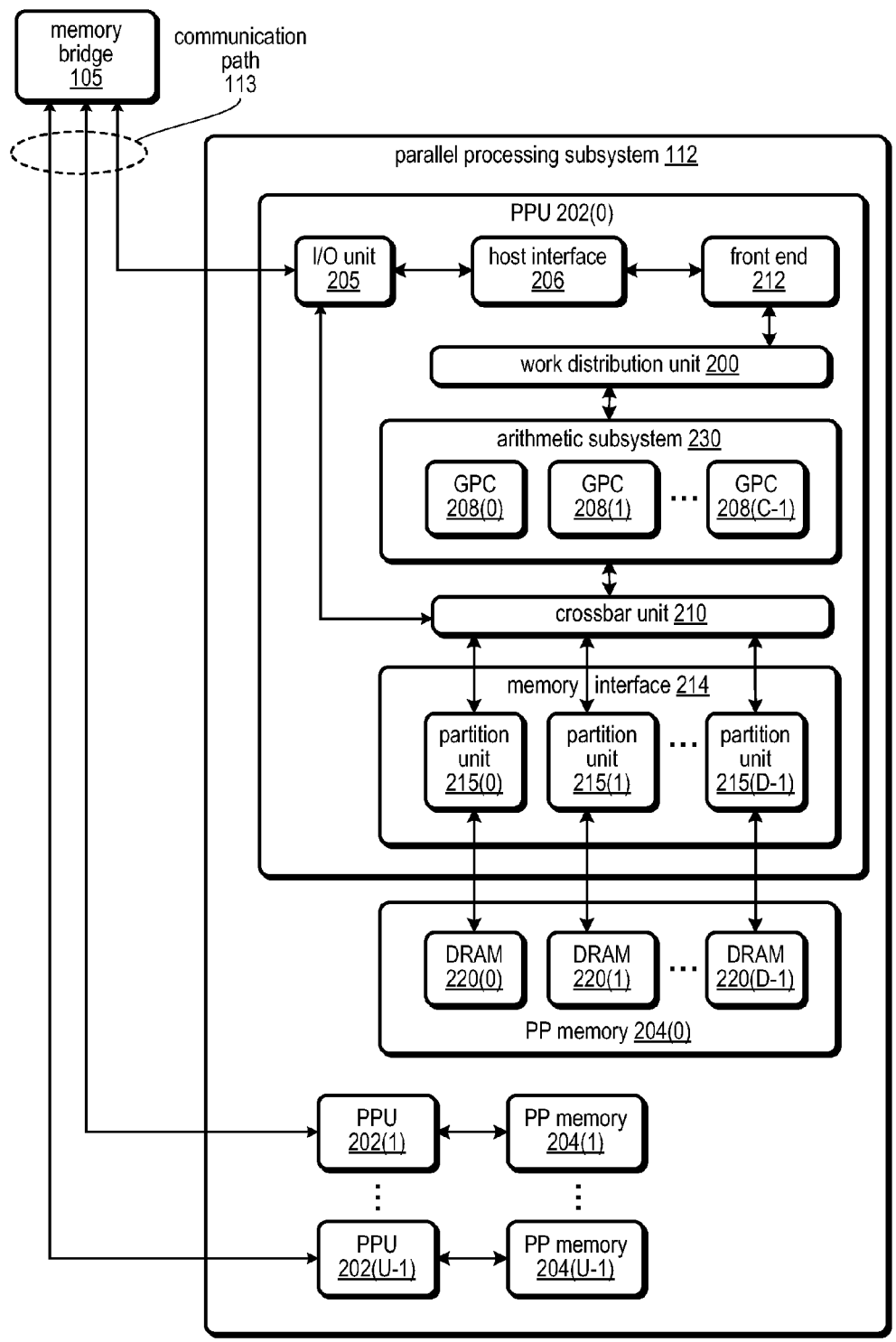
FIG. 2 is a block diagram illustrating a parallel processing subsystem, according to one embodiment of the present invention.

FIG. 2 is a block diagram illustrating a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some implementations, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some implementations, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of camera system 100, controlling and coordinating operations of other system components. In particular, CPU 102 issues commands that control the operation of PPUs 202. In some implementations, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of camera system 100 via communication path 113, which connects to memory bridge 105 (or, in one alternative implementation, directly to CPU 102). The connection of PPU 202 to the rest of camera system 100 may also be varied. In some implementations, parallel processing subsystem 112 is implemented as an add-in card that can be inserted into an expansion slot of camera system 100. In other implementations, a PPU 202 can be integrated on a single chip with a bus bridge, such as memory bridge 105 or I/O bridge 107. In still other implementations, some or all elements of PPU 202 may be integrated on a single chip with CPU 102.

In one implementation, communication path 113 is a PCIe link, in which dedicated lanes are allocated to each PPU 202, as is known in the art. Other communication paths may also be used. As mentioned above, a contraflow interconnect may also be used to implement the communication path 113, as well as any other communication path within the camera system 100, CPU 102, or PPU 202. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes an arithmetic subsystem 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed via a work distribution unit 200, which receives commands defining processing tasks from front end unit 212. Front end 212 ensures that GPCs 208 are configured to a valid state before the processing specified by the pushbuffers is initiated.

When PPU 202 is used for graphics processing, for example, the processing workload for operation can be divided into approximately equal sized tasks to enable distribution of the operations to multiple GPCs 208. A work distribution unit 200 may be configured to produce tasks at a frequency capable of providing tasks to multiple GPCs 208 for processing. In one implementation, the work distribution unit 200 can produce tasks fast enough to simultaneously maintain busy multiple GPCs 208. By contrast, in conventional systems, processing is typically performed by a single processing engine, while the other processing engines remain idle, waiting for the single processing engine to complete tasks before beginning their processing tasks. In some implementations of the present invention, portions of GPCs 208 are configured to perform different types of processing. For example, a first portion may be configured to perform vertex shading and topology generation. A second portion may be configured to perform tessellation and geometry shading. A third portion may be configured to perform pixel shading in screen space to produce a rendered image. Intermediate data produced by GPCs 208 may be stored in buffers to enable the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other implementations, the number of partition units 215 may not equal the number of memory devices. Dynamic random access memories (DRAMs) 220 may be replaced by other suitable storage devices and can be of generally conventional design. Render targets, such as frame buffers or texture maps may be stored across DRAMs 220, enabling partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one implementation, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the implementation shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) implementation. In such implementations, little or no dedicated graphics (parallel processing) memory would be provided, and PPU 202 would use system memory exclusively or almost exclusively. In UMA implementations, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

One embodiment of the invention may be implemented as a program product for use on a computer system, such as the camera system 100 of FIG. 1 for example. One or more programs of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Overview of a Camera Control System

The current approach harnesses the processing power of mobile devices to enable desktop-like workflow on digital cameras and on mobile devices (e.g., cell phones) having digital cameras. The camera control system uses these processing capabilities to introduce the notion of real-time viewfinder editing, which enables the user to perform edits directly on the viewfinder prior to capture. The camera control system brings the WYSIWYG interface to both computational photography applications and for enabling the user to see directly the effects of interactive edits on the viewfinder. Using this interface, the camera control system also gathers information on which aspects of the image are important to the user, which again affects capture parameter selection such as the number of images to capture, the values for exposure, focus, white-balance, and so forth. To realize this philosophy, the camera control system uses a unified framework in which the user provides input (e.g., sparse, stroke-based input, etc.) to control local or global tone, color, saturation, and focus, among other parameters. The user then receives immediate feedback on the viewfinder.

The selections the user provides are affinity-based. The camera control system stores the selections as a sparsely sampled function over the image-patch space. The camera control system then propagates selections to subsequent viewfinder frames by matching image patches. The camera control system applies the edits both to the viewfinder image and to the high-resolution image(s) the user eventually decides to capture (e.g., by actuating the shutter). Also, the camera control system internally uses the edits to drive the camera control routines that determine the appropriate exposure and/or focus value(s), etc. The user can even provide inconsistent cues, which can then be satisfied by taking two images with different settings and combining the result.

The control system enables the user to make better decisions regarding composition because the camera control system makes the user aware of how the user's pending edits will affect the captured photograph. The camera control system serves as a pre-visualization tool in this regard, providing a novel user experience. Also, the system enables the camera control routines to better optimize the capture parameters, such as focus, exposure, gain, and white balance. The user is expressing how the will transform the image, enabling the algorithms to deduce the noise threshold, depth of field, and dynamic range necessary to support the transform. For instance, if the user wishes to locally brighten a dark region of the scene, the user's input ought to lead to a different metering decision; or, if the user is happy to let the sky saturate on the display, a full exposure stack should not be necessary. In this framework, stack-based computational photography merges seamlessly with traditional photography, kicking in when and substantially only when necessary.

The camera control system provides a fast edit propagation algorithm, a viewfinder interface that visualizes the edits, tone-mapping, and multi-exposure blending, and camera control routines to take advantage of the knowledge of the visualization, which altogether form a system that can run at interactive rates on a mobile platform and/or a desktop platform, among other platforms.

Figure 3:
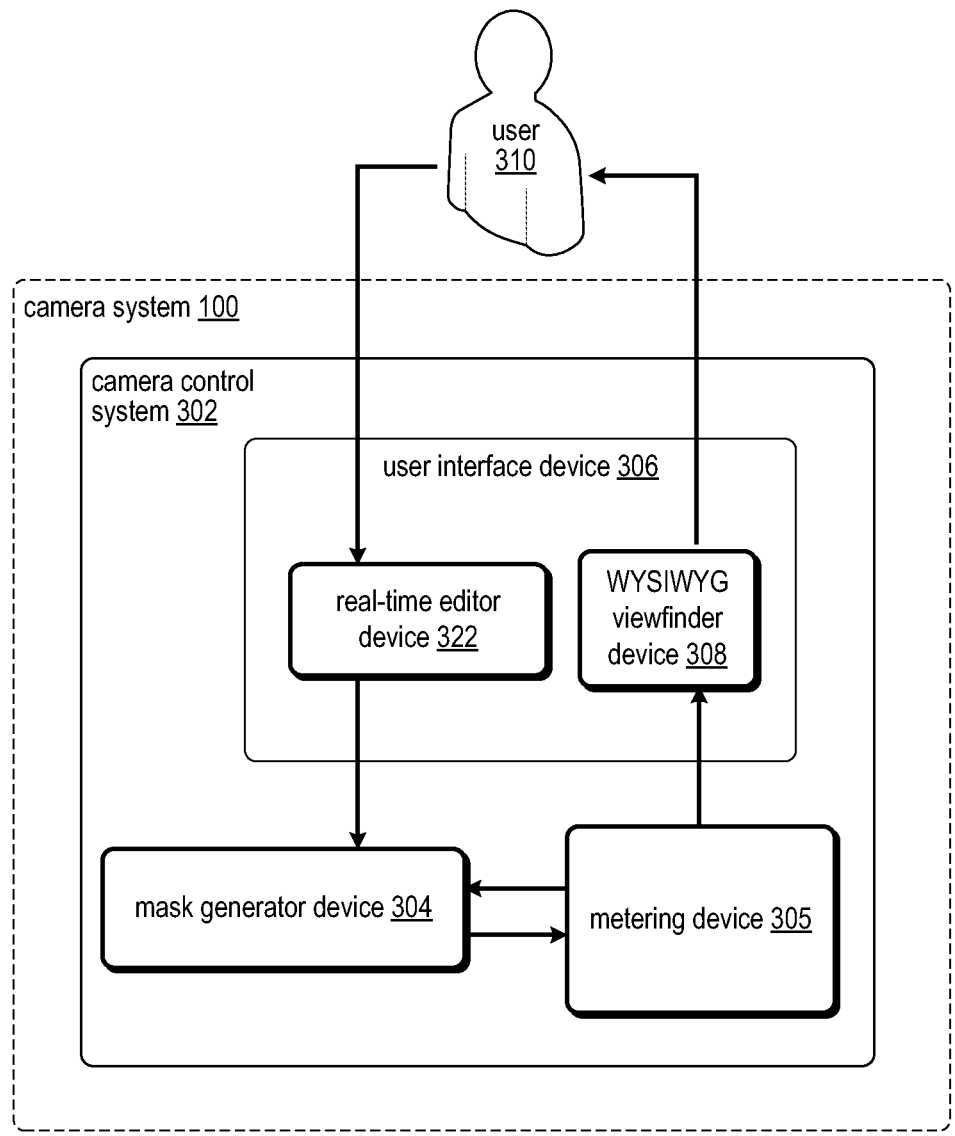
FIG. 3 is a block diagram of the camera system including a camera control system, according to one embodiment of the present invention.

FIG. 3 is a block diagram of the camera system 101 including a camera control system 302, according to one embodiment of the present invention. As shown, the camera control system 302 includes, without limitation, a user interface device 306, a mask generator device 304, and a metering device 302, which are couple to each other. The user interface device 306 includes without limitation a real-time editor device 322 and a what-you-see-is-what-you-get (WYSIWYG) viewfinder device 308.

The user interface device 306 is a front-end device that uses a fast spatio-temporal edit propagation framework to enable stroke-based editing of the viewfinder at an interactive rate. The camera control system 302 models edits as a function over an image-patch space and stores the edits in a high-dimensional data structure.

The metering device 305 is a back-end device that uses HDR metering to optimize the quality of the edited viewfinder image that is displayed on the screen. For a given user edits and a scene (e.g., represented by a tone mapped HDR image constructed in real-time), the metering device 305 generates the metering parameters (e.g., exposure time, etc.) that maximize the HDR image's appearance quality for the display. In particular, the metering device 305 factors in a perceptually motivated threshold for each displayed pixel, maps the threshold backward through the image processing pipeline (including user edits and tone-mapping) in order to compute the acceptable noise threshold at the image sensor, and then calculates the set of exposures that would satisfy the computed thresholds for the entire image. This scheme is in contrast to existing HDR metering algorithms that aim to acquire the physical scene radiance as faithfully as possible.

The mask-generator device 402 is a back-end device that generates an edits mask by classifying texture of a scene, generating a sparse edits mask, performing edge-preserving smoothing, and then constructing the edits mask. The actions are explained further below with reference to FIG. 5.

The camera control system 302 may be carried out on a dedicated digital camera, a desktop computer, a laptop computer, tablet computer and/or a mobile phone, among other platforms. The camera control system 302 is further described below with reference to FIGS. 4A-5.

Example Viewfinder Editing

FIGS. 4A-4E are a sequence of diagrams that illustrate editing on a viewfinder device 308 of a user interface device 306, according various embodiments of the present invention. The camera control system processes viewfinder edits to display more accurately an image that the user intends to capture. The camera continuously captures frames of the scene at which the camera lens is pointing and continuously uses the frames for processing in back-end operations. The back-end operations involve operations that combine the viewfinder edits and the captured frames of the camera. Accordingly, the camera control of the approach involves operations that are ongoing, iterative, and highly dependent on one another. Thus, the viewfinder editing occurs in real-time (e.g., while the camera captures frames of the scene for back-end processing).

Figure 4A:
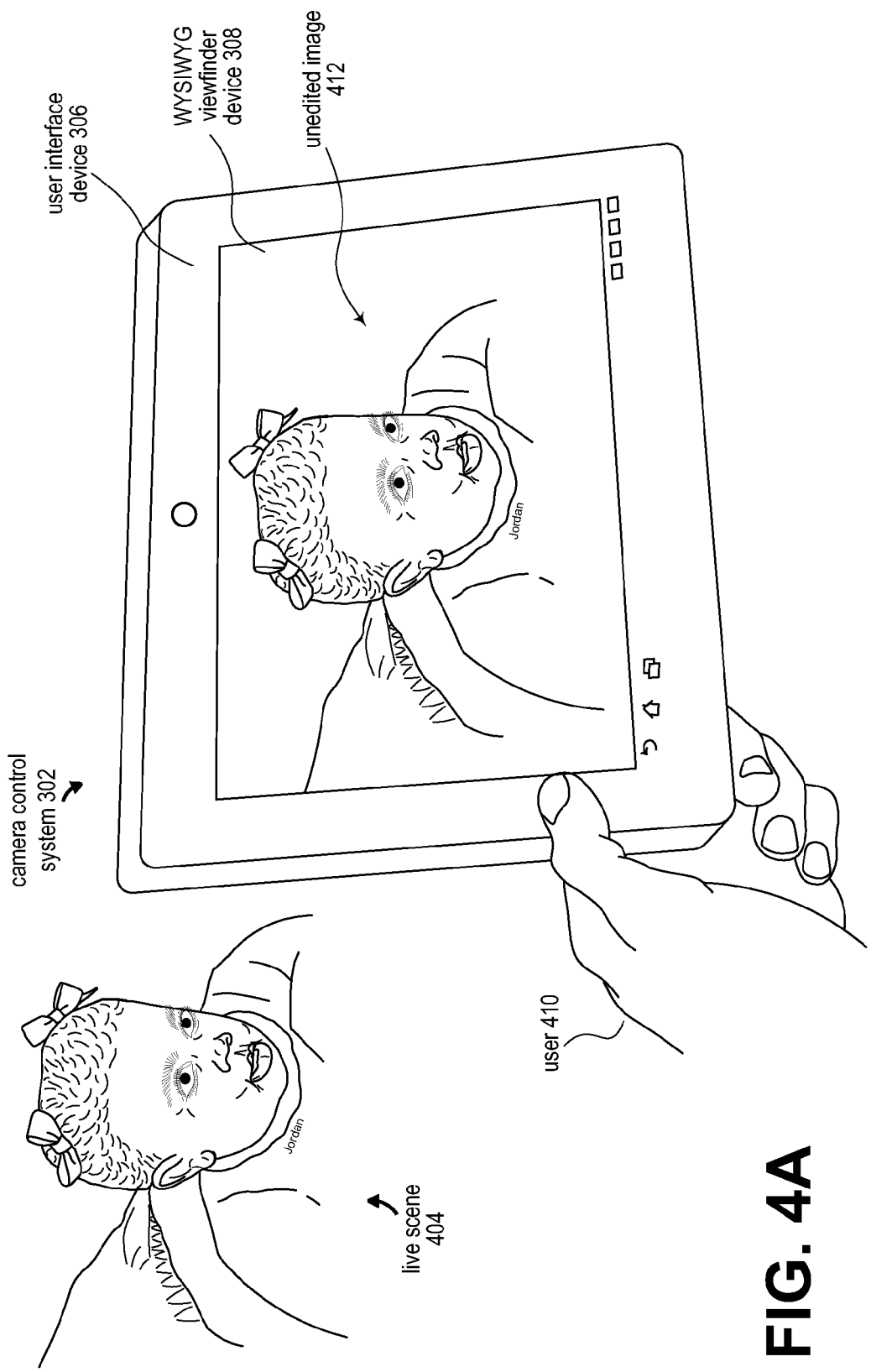
FIG. 4A is a conceptual diagram of a camera system during an initial stage of camera control operations, according to one embodiment of the present invention.

FIG. 4A is a conceptual diagram of a camera system 302 during an initial stage of camera control operations, according to one embodiment of the present invention. The camera control system 302 is powered on and includes a user interface device 306 having a WYSISYG viewfinder device 308. A user 410 is pointing the camera lens (not shown) toward a live scene 404. The live scene 404 is "live" because the scene includes objects (e.g., people, landscape, animals, and/or any other object, etc.) that are potentially moving, and also because the camera is potentially moving at least a little. However, alternatively, an object in the live scene 404 may be substantially still and unmoving relative to the position camera.

At this initial stage, the camera control system 302 depicts the live scene 404 as an unedited image 412 on the WYSIWYG viewfinder device 308 of a user interface device 306. In this example, the camera control system 302 is illustrated as being part of a camera of a tablet computer. Other examples, besides a tablet computer, include a smart phone, a dedicated digital camera, a laptop computer, a mobile phone, a mobile device, a personal digital assistant, a personal computer or any other device suitable for practicing one or more embodiments of the present invention.

Figure 4B:
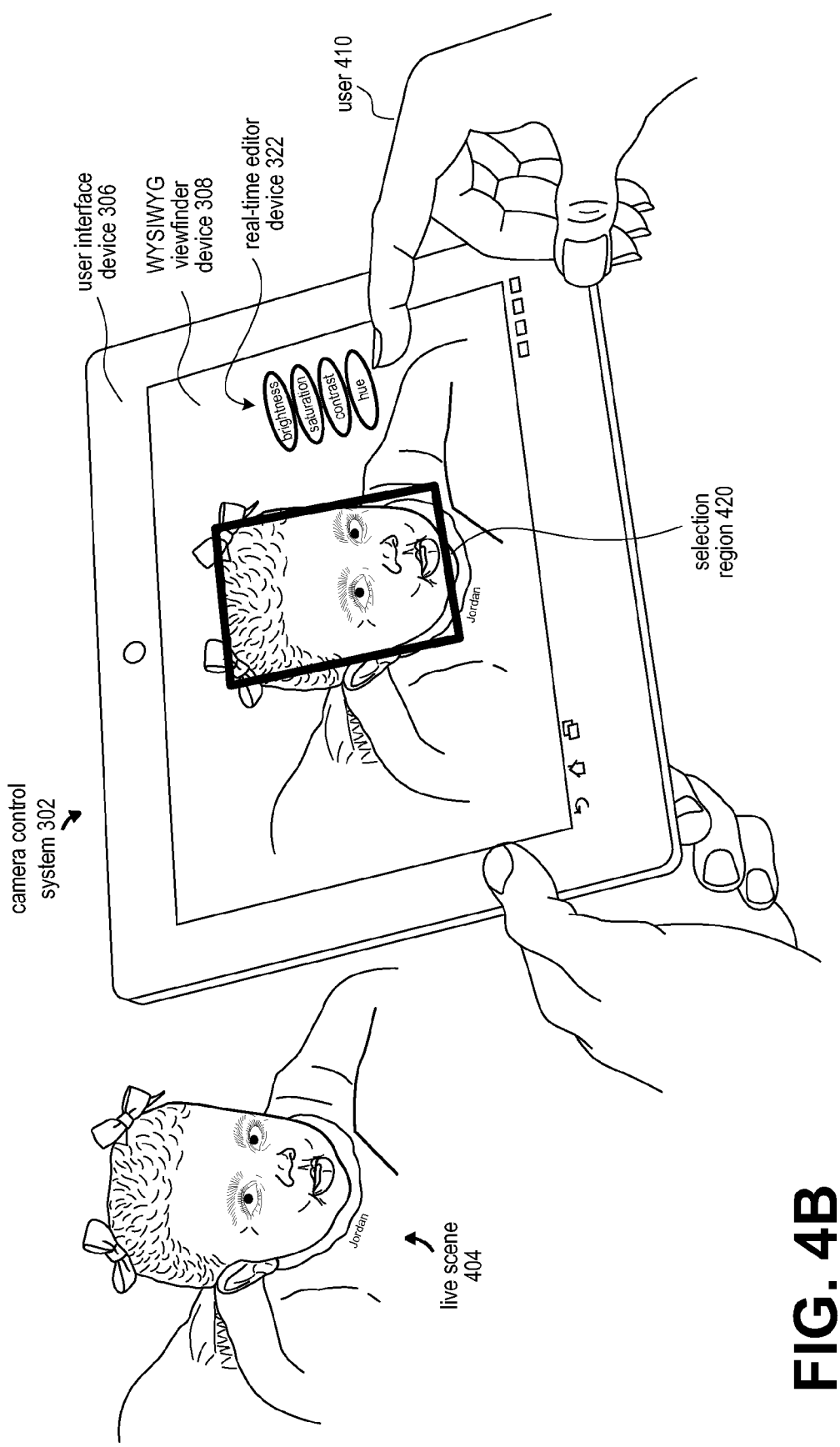
FIG. 4B is a conceptual diagram of the camera system while a user is performing real-time editing on the user interface device, according to one embodiment of the present invention.

FIG. 4B is a conceptual diagram of the camera system 302 while a user 410 is performing real-time editing on the user interface device 306, according to one embodiment of the present invention. In one implementation, the camera control system 302 can receive sparse strokes (not shown) from the user 410 on the user interface device 306 as if the user interface device 306 is a painting canvas. As the camera control system 302 receives strokes on the user interface device 306, the camera control system 302 marks corresponding image patches of a selection region 420. The camera control system 302 can receive a confirmation of the selection region 420 by receiving a tap (or mouse click, etc.) within the region of the selection region 420. Alternatively, the camera control system 302 can receive a cancelation of the selection region 420 by receiving, for example, a tap (or mouse click, etc.) outside of the region of the selection region 420.

The selection region 420 includes a portion and/or all of the pixels of the user interface device 308. In this example, the selection region 420 is a rectangle. Alternatively, the selection region may include another shape, such as, for example, a circle, an oval, any type of polygon, among other shapes. The selection region 420 may also, or alternatively, be based on texture. For example, a sky may have a different texture than a person's face. Accordingly, in one implementation, the camera control system 302 can identify differences in texture and acquire the selection region based on texture matching (e.g., matching a sky's texture to select the sky as the selection region, or matching a person's texture to select the person as the selection region, etc.)

The camera control system 302 stores image patches of the selection region 420 in a data structure that supports matching image patches. In subsequent frames of the live scene 404 (which is fluid and not still) the camera control system 302 selects pixels having corresponding image patches that match the previously selected patches. As no tracking is involved, the camera control system 302 is robust against motion and/or occlusions of the scene and/or the camera lens.

Confirming the selection region 420, the real-time editor device 322 displays various edit options. In this example, the edit options include brightness, saturation, contrast, and hue. Other examples of edit options (not shown) may include without limitation white balance, color, tone, focus, exposure, gain, and grey scale. The camera control system 302 is configured to receive a selection of one of the edit options from the user 410.

Figure 4C:
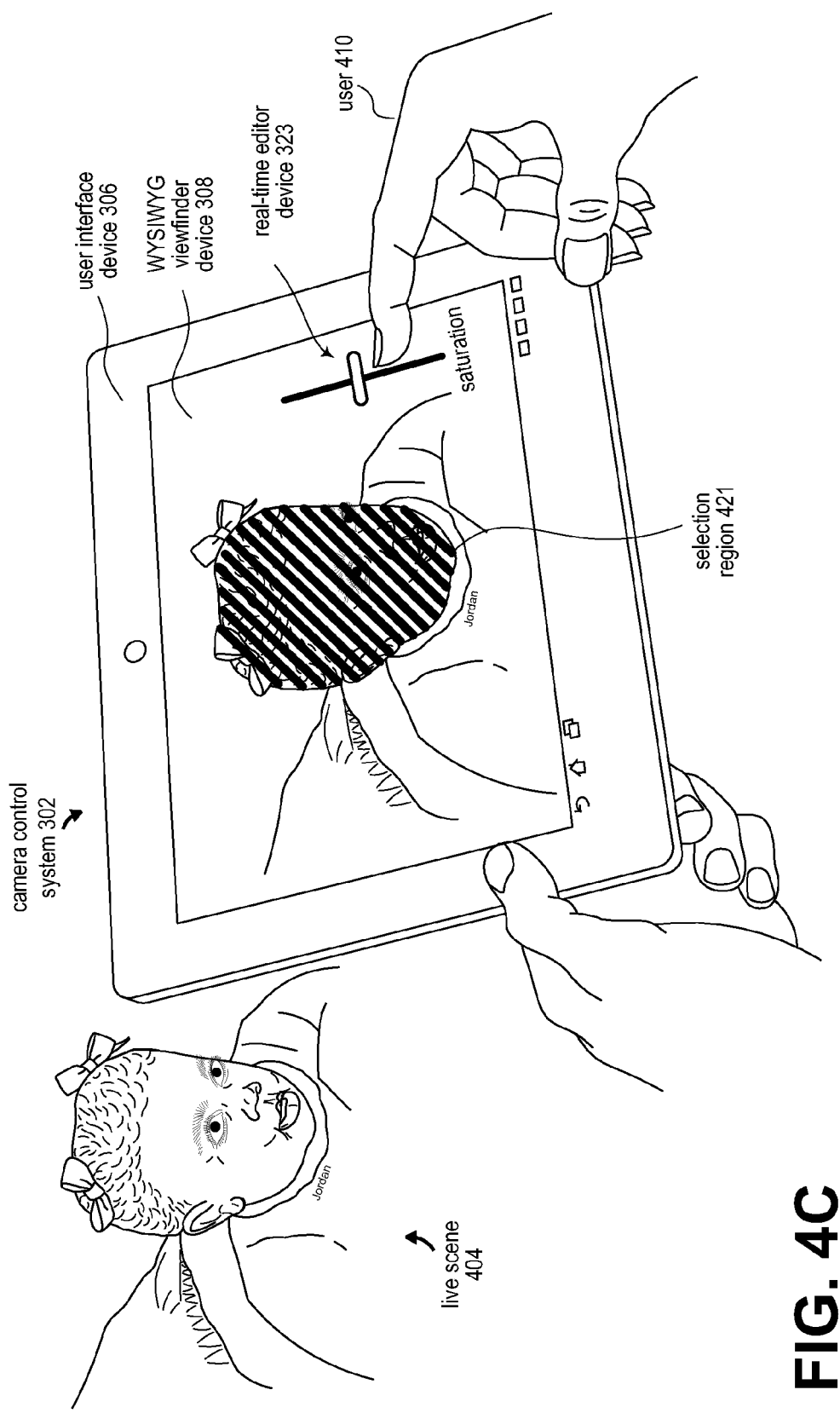
FIG. 4C is a conceptual diagram of the camera control system during real-time editing following operations of FIG. 4B, according to one embodiment of the present invention.

FIG. 4C is a conceptual diagram of the camera control system 302 during real-time editing following operations of FIG. 4B, according to one embodiment of the present invention. In this example, the selection region 421 is shown as including the baby's face. The camera control system 302 is edge-preserving (e.g., edge-aware) and is able to distinguish between texture of the object (e.g., baby's face or baby's skin) and texture of another part of the live scene 404. The user interface device 306 has received from the user 410 a selection of the saturation edit option on the real-time editor device 323. The real-time editor device 323 displays on the user interface 306 a slider that enables the camera control system 302 to receive from the user 410 a selection of saturation magnitude. In this example, the real-time editor device 323 updates accordingly as the camera control system 302 receives a stroke gesture from the user 410 to indicate a saturation magnitude. In another example, the real-time editor device 323 may be configured to receive a stroke gesture on the selection region 321 without a visible slider.

Figure 4D:
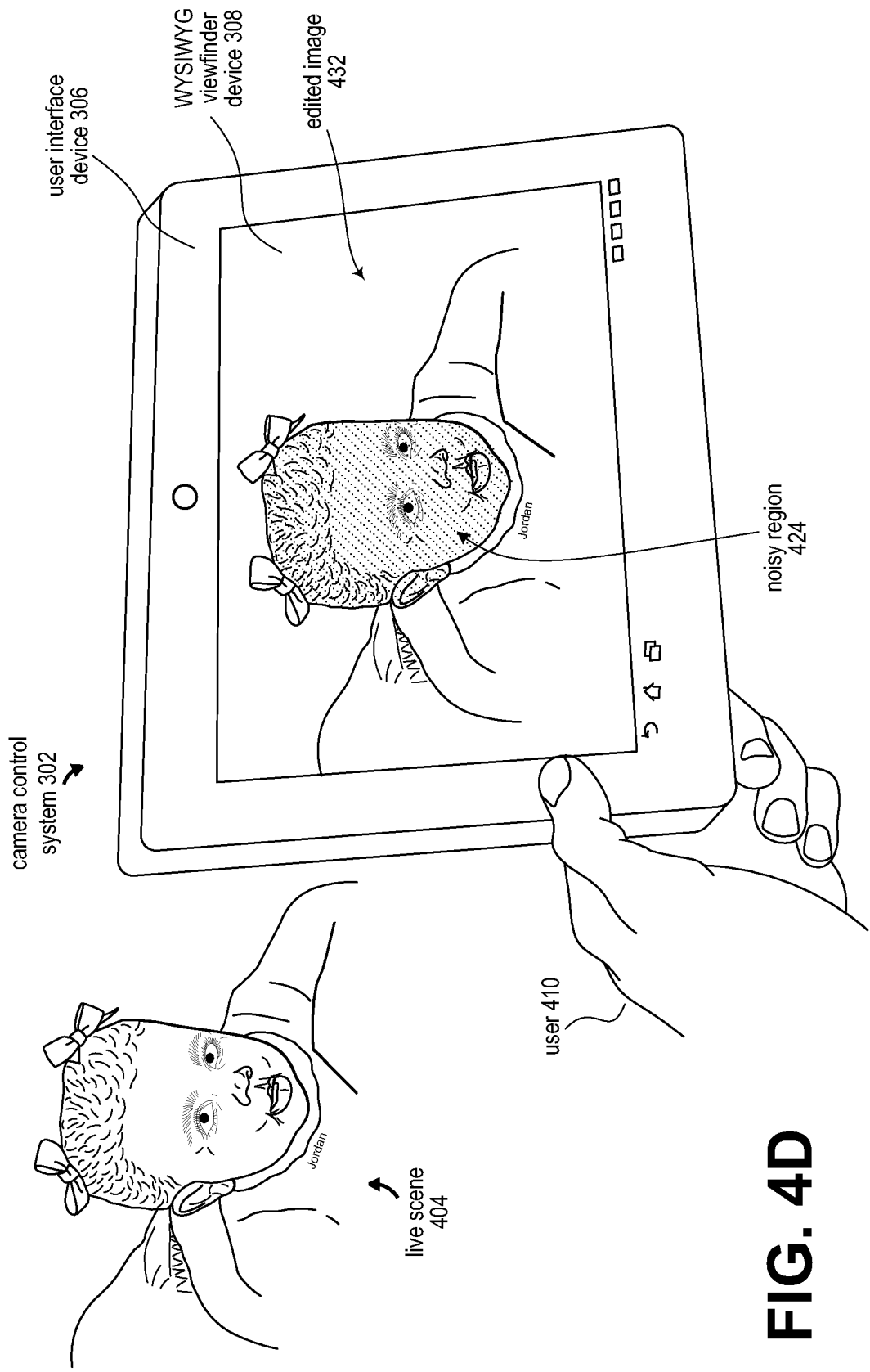
FIG. 4D is a conceptual diagram of the camera control system during real-time editing following operations of FIG. 4C, according to one embodiment of the present invention.

FIG. 4D is a conceptual diagram of the camera control system 302 during real-time editing following operations of FIG. 4C, according to one embodiment of the present invention. The region of selection region 421 (FIG. 4C) that the camera control system 302 is receiving edits regarding saturation becomes noisy, as shown in FIG. 4D, as the camera control system performs processing on the selection. The noisy region 424 can by a useful feature of the camera control system 302. For example, by displaying an edited image 432, the camera control system 302 can notify the user that processing is occurring for the requested user edits. This step of displaying noise is an alternative step and may or may not be a feature of the camera control system 302, depending on the embodiment. For example, processing of the camera control system 302 may be sufficiently fast such that the user 410 does not need to be notified by displaying noisy output.

Figure 4E:
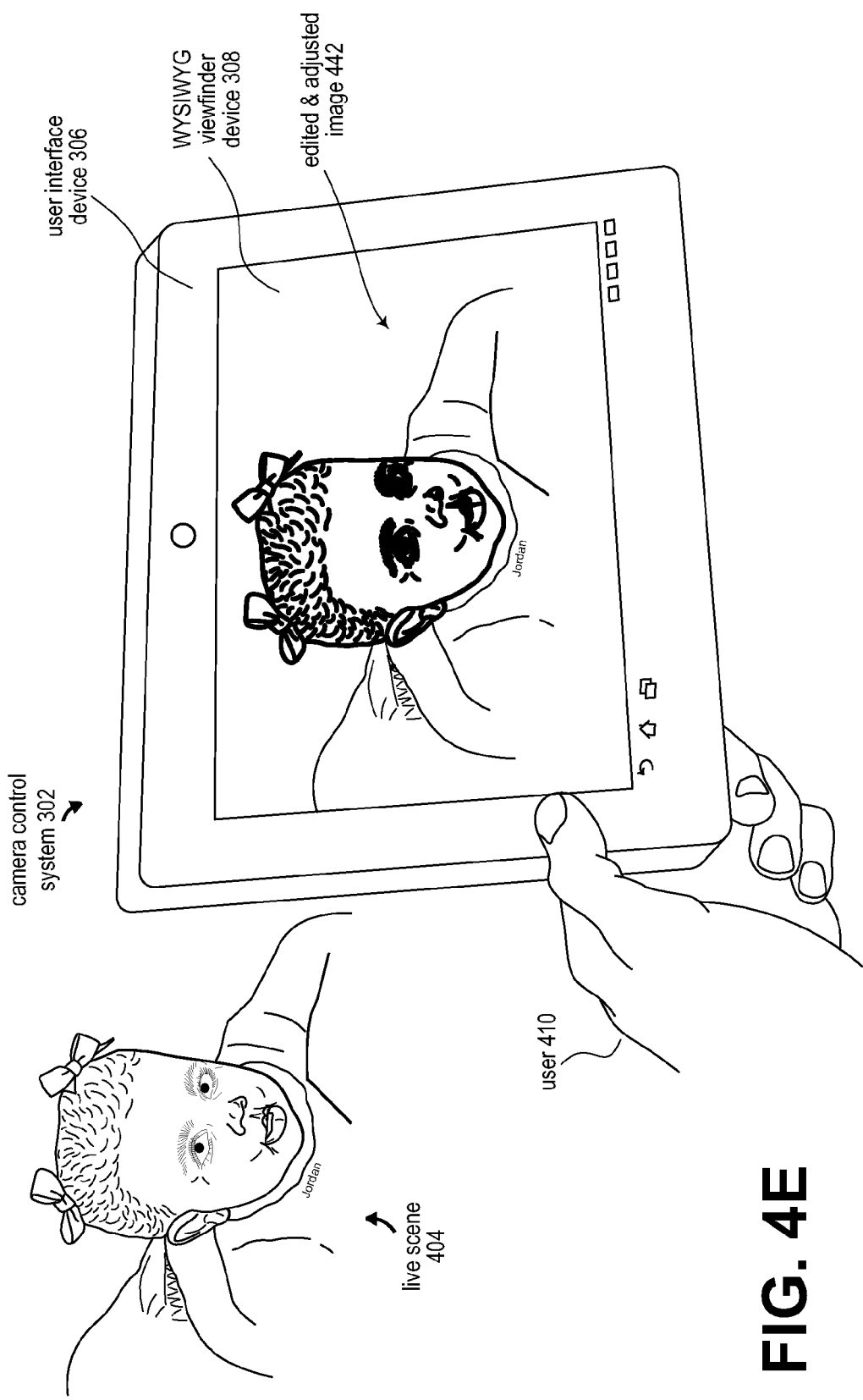
FIG. 4E is a conceptual diagram of the camera control system during real-time editing following operations of FIG. 4D, according to one embodiment of the present invention.

FIG. 4E is a conceptual diagram of the camera control system 302 during real-time editing following operations of FIG. 4D, according to one embodiment of the present invention. After selections and edits of the user 410, an edited and adjusted image 442 is shown in FIG. 4E. The camera control system 302 carried out processing on the selection region 420, as described above with reference to FIGS. 4B-4D, where saturation was edited by using real-time edit-aware metering. The displayed image 442 on the viewfinder device 308 is substantially the same image that may be captured as the user 410 inputs a request to actuate the shutter. The displayed image 442 is the result of an application of transforms that otherwise may be applied during post processing steps. However, in the present technology, the camera control system 302 has applied transforms during real-time usage of the camera with respect to the live scene 404, instead of during post processing operations. Such real-time processing makes for a captured image 442 that more accurately depicts the user's intent.

Accordingly, the camera control system 302 enables the user to specify what is important by altering the local appearance, including without limitation brightness, saturation, contrast, hue, tone, color, saturation, and/or focus via stroke-based input. The camera control system 302 delivers visualization of these modifications to the user 410 at an interactive rate and drives the camera control routines to select better capture parameters (e.g., exposure, gain, focus, white balance, etc.), acquiring image bursts as necessary. Such processing requires real-time tracking of multiple regions of interest, real-time visualization of edits on the viewfinder, and determination of the optimal burst capture parameters given the edits. As further described below with reference to FIGS. 4 and 5, the camera control system 302 provides solutions for each of these problems, enabling interactive viewfinder editing on both desktop and mobile platforms. The viewfinder editing of the camera control system 302 improves the selection of capture parameters and provides a more engaging photography experience for the user 410.

Additional Architectural Detail

Referring again to FIG. 3, for image acquisition, the metering device 305 streams raw image data from the sensor (not shown) into a data stack that caches the most recent frames, which are to be merged and processed by a processing thread. The camera control system 302 internally acquires a full exposure or focus stack for display on the view finder of the user interface device 306. Otherwise, a clipped, blurry or underexposed region may interfere with the user's selection later. Hence, the capture parameters are updated on a per-frame basis as follows: the camera control system 302 computes the desired exposure for the k-th frame by taking the histogram of the log-luminance channel of current HDR scene estimate, removes bins that are expected to be covered by frames up to the (k−1)-th frame, and meters the remaining bins. For focal stacks, the camera control system 302 iterates from the minimum to the maximum focus distance in fixed increments.

For edit propagation on the viewfinder device 308, the processing thread of the metering device 305 fetches the N most recent frames (e.g., N=3 for exposure stacks, and N=4 for focal stacks) and merges the frames into an HDR radiance map or an all-focus image. The camera control system 302 can use any formula known to those skilled in the art to merge LDR images into an HDR image. In one implementation, the camera control system 302 can store the resulting scene estimate in a Logluv format (e.g., LogLuv TIFF). Using a format based on a canonical unit is desirable because selections and edits that are based on image patches should be robust against changes in capture parameters.

The mask generator device 304 models selection and edits as functions over the space of an image patch descriptor. The mask generator device 304 computes these functions over each image patch in the scene and generates masks, as further described below with reference to FIG. 5. The metering device 305 then applies the masks onto the encoded data (e.g., Logluv encoded data), tone-maps the resulting output, and displays the output on the viewfinder device 308. Logluv is an encoding used for storing HDR imaging data inside another image format (e.g., TIFF). In case the user interface device 306 receives focus edits, the metering device 305 can recompose the images from the focal stack.

Based on the displayed result, the metering device 305 re-computes the optimal set of exposure and/or focus values, as further described below with reference to FIG. 5. The metering device 305 uses these parameters to affect frames that the camera captures. The metering device 305 passes the captured frame(s) through the aforementioned processing pipeline and generates one HDR image. The metering device 305 performs tone mapping on the HDR image to generate a final output for display on the viewfinder device 308.

The user interface device 306 presents the user with a seemingly normal viewfinder device 308. However, internally, the camera control system 302 is regularly acquiring an exposure and/or focal stack at a back-end. In one embodiment, as described above with reference to FIG. 4B, the user selects a region via stroke gestures. Then, the user may cancel the selection by tapping outside the selected region, or confirm the selection by tapping within, which triggers an overlay with icons representing various types of edits (e.g., brightness, saturation, contrast, hue, etc.). Once the user chooses the type of edit to apply to the selected region, the user makes a swiping gesture horizontally left or right to shift the designated trait (e.g., darker or brighter, sharper or blurrier, etc.).

Method Overview

Figure 5:
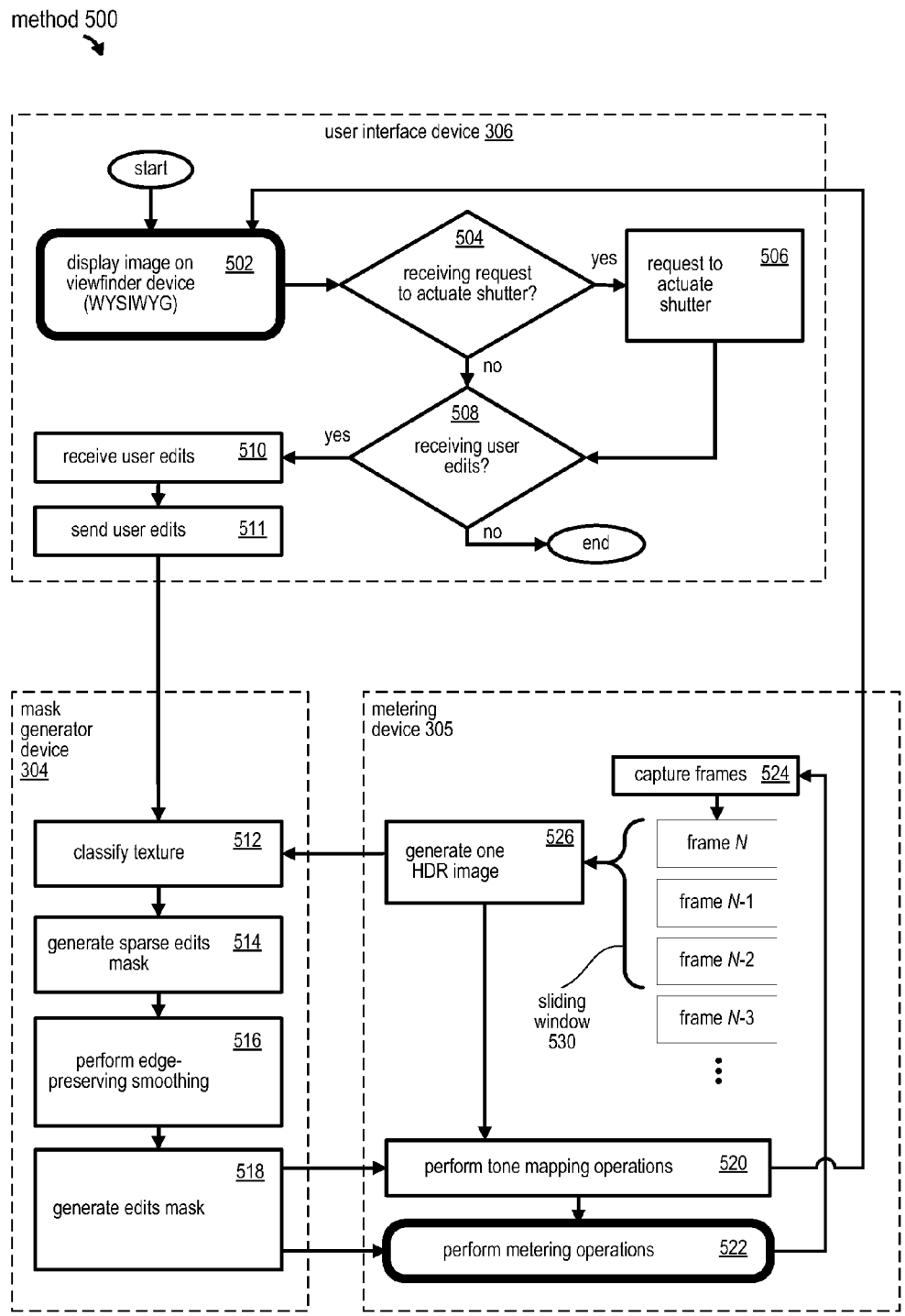
FIG. 5 is a flowchart of method steps for controlling a camera, according to one embodiment of the present invention.

FIG. 5 is a flowchart of method steps for controlling a camera, according to one embodiment of the present invention. In some implementations, the method steps may be carried out by the camera control system 302 of FIG. 3, which includes a user interface device 306, a mask generator device 304, and a metering device 305. As one skilled in the art will recognize, the method steps are fluid, iterative, and highly dependent on one another. For explanatory purposes only, the description of the method steps below arbitrarily starts at the user interface device 306. However, in other examples, the description of the method steps could begin at the metering device 305 or somewhere else in the architecture. Regardless, although the method steps are described herein in conjunction with the systems of FIGS. 1-3, one skilled in the art will understand that any system configured to implement the method steps, in any order, falls within the scope of the present invention.

As shown, a method 500 begins in an action 502, the user interface device 306 displays an image on a viewfinder (e.g., WYSIWYG viewfinder 308 of FIG. 3). For example, the camera is powered on; the camera lens is pointed at and is receiving ongoing input from a scene. Accordingly, the image includes, at least in part, the camera's interpretation of a scene at which the camera lens is pointing. Meanwhile, the viewfinder device receives real-time input from the metering device 305 in an action 520, which is further described below. Accordingly, the image displayed on the user interface device 306 is a real-time combination of frames captured by the camera lens and from processing performed on the frames with respect to user edits. As further described below in other steps, the combination of input is real-time and continuously changing as the scene changes and/or the user edits change.

In a decision operation 504, the user interface device 504 determines if a request to actuate the shutter is being received. If yes, in an action 506, the user interface device 306 sends a request to the appropriate component to actuate the shutter. The camera control system 302 can then actuate the shutter and capture a final image that is displayed on the WYSIWYG viewfinder of the user interface device 504.

However, in decision operation 504, if the user interface device 306 determines there is no request to actuate the shutter, the method 500 moves to a decision operation 508 where the user interface device 306 determines if user edits are being received. If no, then the method 500 is at an end and may return to the start to continue.

However, in decision operation 508, if the user interface device 306 determines that user edits are being received, then the method 500 moves to an action 510 where the user interface device 306 receives the user edits. For example, the user communicates the user's intention by selecting a region and/or all of the viewfinder and performing edits (e.g., brightening or darkening, shifting color, altering saturation and contrast, etc.) via scribble gestures.

In an action 511, the user interface device 306 sends the one or more user edits to the mask generator device 304.

In an action 512, the mask generator device 304 classifies image patches of the selection region with respect to the one or more user edits. For example, the mask generator device 304 begins the process of transforming the selection region into a data format (e.g., image patches) that the camera control system can match over multiple frames. Meanwhile, the mask generator device 304 receives feedback from the metering device 305 during an action 526, which is further discussed below.

In an action 514, the mask generator device 304 specifies a sparse edits mask. For example, the mask generator device 304 enables image patches to be matched in subsequent viewfinder frames, so that the gestures remain persistent. Matching image patches over multiple viewfinder frames can be achieved by matching image patches that look alike (e.g., matching each 8 pixel by 8 pixel texture patch or any size texture patch). Each patch includes a subset of pixels of the selection region. Whenever the user scribbles over a patch to select the patch or to apply edits, the camera control system updates the displayed image to reflect the change. Propagation is achieved by matching the patches in each viewfinder frame in order to infer selection and the application of edits.

In an action 516, the mask generator device 304 performs edge-aware up-sampling on the edits mask. Edge-aware smoothing is described above in the section related to specifying edits.

In an action 518, the mask generator device 518 generates an edits mask for use by the metering device 305. The edits mask takes into account the In an action 520, the metering device 305 performs a tone mapping operation 520. Meanwhile, in an action 522, the metering device 305 performs metering operations. Based on the edits mask and the tone mapped HDR image, the metering device 305 generates the metering parameters (e.g., exposure time, etc.) that maximize the HDR image's appearance quality for the display. For example, the metering device 305 quantifies metering requirements based on an edits mask and a tone mapped HDR image, meters the tone mapped HDR image to calculate metering parameters, and provides to the camera the metering parameters that affect frame capturing operations and thereby maximize the appearance of the captured HDR image for the display (e.g., displaying the post-edits).

For instance, the metering device 305 is configured to react to user edits, for example, by introducing metered output including a bracket (e.g., exposure brackets and/or focus brackets, etc.) in order to comport with the constraints implied by the user edits. The metering device 305 analyzes the tone mapped HDR image and edits mask to determine the metering parameters. The metering device 305 then selects the capture parameters for the next viewfinder frame to be requested. Depending on the types and extent of edits, certain luminance and/or depth ranges may become more or less important to capture, relaxing and/or tightening the constraints on the algorithms of the adjust device 305. The metering device 305 feeds the metering for display back into the metering device 305 to affect captured frames.

In an action 524, the metering device 305 captures frames of the live scene. In this example of FIG. 5, the metering device 305 captures frames of a sliding window 530 having a predetermined number of frames. The sliding window 530 includes sequence of three frames at a time. For example, at a time $t_{k-1}$, the sliding window includes a sequence of adjacent frames, including frame N-5, frame N-4, and frame N-3. At a time $t_k$, the sliding window includes a sequence of adjacent frames, including frame N-2 frame N-1, and frame N, and so on. The size of the sliding window may be affected by the user edits. For example, the edits masks generated at the action 518 can affect the size of the sliding window. For instance, if the camera control system 302 receives an input from the user to brighten a very dimly lit selection of the scene, then the edits may require an additional shot (e.g., additional frame in the sliding window 530) with longer exposure and/or higher gain in order to recover data in that selection region. Such user edits affect the level of acceptable signal-to-noise (SNR), which is directly linked to the optimal choice of exposure and/or gain.

In an action 526, the metering device 305 generates one HDR image. For example, the metering device 305 blends, aligns, and/or merges the frames of the sliding window 530 to generate one estimate of a high dynamic range (HDR) image. In another example (not shown), the camera system includes a camera sensor that directly captures HDR frames. In such a case, the metering device 305 does not need to blend multiple frames as shown in FIG. 5. Generally, the metering device 305 needs to generate one HDR image. The particular manner in which the metering device 305 generates the HDR image is typically not so important.

Referring again to the action 520, the metering device 305 combines the edits mask and the HDR image to perform the tone mapping operation. The metering device 305 then provides an edited and adjusted image for display on the viewfinder device of the user interface device 306. For example, the camera control system writes to textures asynchronously the user edits of the user interface device 306, the selection mask of the mask generator device 304, and the scene radiance estimates of the metering device 305.

Returning to the action 502, the user interface device 306 displays the edited and adjusted image received from the metering device 305. For example, the frontend application (e.g., the Android user interface) composes the final image and then renders the final for display. As described above, the actions of the method 500 are iterative. Accordingly, the camera control system regularly updates the displayed image as the camera control system receives user edits, receives scene changes, and/or receives camera movement, among other input.

The method 500 may include other actions and/or details that are not discussed in this method overview. For example, the method 500 is applicable to video as well as still images. A difference with video is that actuation of the shutter causes the camera to capture a sequence of images over a period of time, as opposed to one still image at one moment in time. For video, accurate control over capture parameters without causing undesirable temporal artifacts is even more challenging (e.g., too drastic change of the exposure settings is perceived by humans as flickering). As another example, at least some method steps may be carried out by using the parallel processing subsystem 112 of FIGS. 1 and 2; it may be desirable for the camera control system to process some method steps in parallel for the sake of speed and for having an optimal user experience. Other actions and/or details described herein may be a part of the method 500, depending on the implementation. Persons skilled in the art will understand that any system configured to implement the method steps, in any order, falls within the scope of the present invention.

Additional Viewfinder Editing Detail

Image editing on the viewfinder device 308 must accommodate temporally persistent selection of objects through sparse user input. At the same time, the camera control system 302 processes each viewfinder frame independently without relying on preprocessing or training an expensive classifier.

Borrowing from conventional work on affinity-based edit propagation on image sequences, the camera control system 302 models edits and the selection as functions residing in a space of local patch descriptors:

$$S_i: \mathbb{R}^n \to [-1,1], \qquad (1)$$

where n (e.g., 8) is the dimensionality of the patch descriptor, and each of $S_1, S_2, \ldots$ corresponds to a particular type of edit, such as tone, color, saturation, blurriness. The value of 0 corresponds to no editing. The camera control system 302 reserves $S_0: \mathbb{R}^n \to [0, 1]$ as a soft selection mask.

In one example, the camera control system 302 can use an 8-dimensional descriptor (e.g., n=8) based on an 8 pixel×8 pixel image patch, composed of the mean and the first-order and the second-order derivatives of the log-luminance channel, plus the mean CIELUV chrominance. (CIELUV is a color space adopted by the International Commission on Illumination (CIE) in 1976.) To decide which features to use, the camera control system 302 performs a principal component analysis (PCA) on a set of generic image patches. The strongest PCA component has been found to be similar to the patch mean, while the next components could be reasonably approximated by the derivatives of the log-luminance, and so forth. Note that in a departure from previous work, the camera control system 302 drops the (x, y) coordinate from the descriptor, in order to be robust against scene and camera motion.

Existing methods attempt to globally optimize or interpolate $\vec{S}_i$ based on the user-provided samples, and as a result, the cost for estimating $\vec{S}_i$ scales linearly with the number and extent of edits the user has already performed. Instead, the camera control system 302 stores $\vec{S}_i$ in a sparse data structure, and treat this issue as a lookup problem. Thus, incrementally updating $\vec{S}_i$ has an O(1) cost.

Because the camera control system 302 forgoes an explicit optimization or interpolation action, edits may not propagate as aggressively as with other methods. However, this issue is mitigated in two ways: first, the camera control system 302 applies edge-aware smoothing on $S_i$ with respect to the scene image whenever a viewfinder frame is produced. Second, because the camera control system sends feedback interactively as the camera control system receives the user's strokes, controlling propagation is easy and intuitive for the user. For example, the user paints (e.g., provides strokes for) $S_i$ interactively.

Viewfinder Editing: Representing Edits

For storing $\vec{S}_i$, the camera control system 302 adapts the commonly known permutohedral lattice, which tiles high-dimensional space with simplices and stores samples in the vertices. The camera control system 302 uses the lattice to perform barycentric interpolation for insertion and lookup, which incidentally serves to locally propagate the stored data. While the lattice can be used to support high-dimensional filtering algorithms, the camera control system 302 can use the lattice to house high-dimensional functions quite effectively.

Instead of initializing the lattice with all patches present in a given image, as one could do with high-dimensional filtering, the camera control system 302 takes a streaming approach: as the user strokes over the screen and selects patches (e.g., selection region 420), the camera control system 302 locates only those vertices corresponding to these patches and updates their values. Note that unselected patches are never written into the lattice. If a patch lookup fails at any point, a default value is assumed for $\vec{S}_j$.

To further support streaming edits, the camera control system 302 can augment the lattice with a decaying scheme similar to the one used in a commonly available video filtering algorithm. The camera control system 302 associates with each vertex a perceptual importance measure, which the camera control system 302 increases every time the camera control system 302 accesses the vertex, and decays exponentially over time. Hence, an image patch that remains in the viewfinder will have high importance, whereas a patch that goes out of view for a long time will have low importance. The camera control system 302 keeps track of the time each vertex is last updated. Whenever a vertex is accessed for a read or a write, the camera control system 302 decays the vertex's importance appropriately. When the lattice is at capacity and a new vertex must be inserted, the camera control system 302 examines those nodes with hash collision and evicts the vertices with the lowest importance.

Viewfinder Editing: Specifying Edits

The camera control system 302 is configured to specify edits, as described above with reference to FIGS. 4A-4E. The camera control system 302 receives strokes over the region of interest and receives a confirmation of the selection (e.g., a tap and/or a mouse click on the selected area). Then, the camera control system 302 presents the user with a widget (e.g., real-time editor device 322) listing the various types of edits supported, and the camera control system 302 receives a selection (e.g., a tap) of the user's choice. Next, the camera control system 302 receives input (e.g., user horizontally swipes left or right) that specifies a magnitude and a direction of the edit. All of the actions for specifying edits are interactive. For example, as the user moves his finger (or style, mouse pointer, etc.) on the screen, the camera control system 302 performs back-end processing and updated edits are depicted on the viewfinder.

For patch selection (e.g., selection region 420), while the user stroke is being registered, the camera control system 302 converts image patches having centers that are within a small fixed distance from the event origin into descriptors and looks up the descriptors from the lattice (e.g., permutohedral lattice described above). If the corresponding nodes do not exist, the camera control system 302 generates and initializes the corresponding nodes. The camera control system 302 increments the value of $S_0$ for these nodes. As such, the cost of applying selection is O(1), independent of viewfinder dimensions and the edit history.

For visualization on the viewfinder device 308, for each viewfinder frame, the camera control system 302 converts the image patches contained within the frame into descriptors, and looks up each descriptor's associated edits on the lattice. If the user is in the third phase and is currently applying an edit of type j with extent k, then for each descriptor patch $\vec{p}$, the camera control system 302 adjusts $S_j(\vec{p})$ as follows:

$$S_j(\vec{p}) := S_j(\vec{p}) + k \cdot S_0(\vec{p}). \quad (2)$$

This adjustment occurs dynamically and is not written into the lattice. The camera control system then applies $S_j(\vec{p})$. Thus, the cost of visualizing each viewfinder frame grows linearly with the viewfinder dimensions, and is independent of the content in the lattice.

For finalizing an edit, once the camera control system 302 receives a magnitude and a direction of an edit option, the camera control system 302 folds the current edit operation into the lattice by applying Equation 2 to every patch $\vec{p}$, in the lattice, and resets $S_0(\vec{p})$ to zero. Hence, the cost of finalizing an edit is proportional to the size of the corresponding lattice, and independent of the viewfinder dimensions.

For edge-aware smoothing, in one implementation of visualization, the camera control system 302 processes a sub-sampled set of image patches. This limitation saves a significant amount of time but yields user edit masks at a resolution lower than that of the viewfinder. The camera control system 302 can apply edge-aware up-sampling to an intermediate edit mask by using a domain transform (e.g., time domain transform and/or frequency domain transform), with respect to the edges of the viewfinder content (edges of objects in frames captured by the camera lens). Not only does this operation enable the camera control system 302 to speed up processes, the operation also enables the camera control system 302 to generate higher-quality masks with improved spatial edit propagation. For example, the edge-aware up-sampling operation provides a data format to a processor that causes the processor to operate at a higher rate than a processor operating without the edge-aware up-sampling. As another example, the edge aware up-sampling provides a data format to a processor that causes the edits mask to have a higher degree of spatial edit propagation. When the user orders a full-frame capture, the camera control system 302 generates a full resolution edit masks from the lattice but still applies edge-aware smoothing with domain transform.

Edit-Based Camera Control

Described above are an interface and underlying algorithms for performing edits directly on the viewfinder of the camera control system 302 and propagating edits forward in time. While those features benefits the user by allowing the user to rethink composition based on the edits, those features also provide the camera control system 302 with additional information that the camera control system 302 can use to better select capture metering parameters. Described below are camera control techniques for calculating two types of metering parameters: (1) exposure and (2) focus for each pixel based on the pixel's intended appearance. These two types of metering parameters are provided for explanatory purposes. As described above, other metering parameters include brightness, saturation, contrast, hue, white balance, color, tone, and gain, among other types of parameters. Also described below is a methodology for aggregating the results of metering operations for all the pixels in the viewfinder to generate a set of metering or focusing parameters for the scene.

Edit-Based Camera Control: HDR Metering for Display

Conventional HDR metering algorithms operate to faithfully acquire scene luminance, attempting to maximize the signal-to-noise ratio (SNR). This philosophy makes sense when post-processing to be performed on the luminance data is unknown, and there is no additional information on the importance of different scene elements.

In contrast, in the present technology, the camera control system 302 can leverage the fact that the entire post-processing pipeline, including tone mapping, is known. The user sees on the viewfinder a tone mapped HDR image, and if some areas are too dark, can initiate processes to brighten the areas. A request to brighten indicates longer exposures are needed.

A request to darken saturated areas to increase contrast indicates shorter exposures are needed. The viewfinder image reflects the edits, and once the user is satisfied with the result, the user can request actuation of the shutter and thereby cause the camera to capture the high-resolution HDR image.

The camera control system 302 can quantifying per-pixel exposure requirements. The L takes into account image fidelity at each pixel, and derives the exposure necessary to meet a particular threshold. Let L be the physical scene luminance estimated by the camera, perhaps from multiple exposures; and let I be the k-bit tone mapped result under a global, strictly monotonic tone mapping operator T. The user's edits create an edits map E which, in a spatially varying manner, modulates the luminance estimate L. In one implementation, the camera control system 302 sets $E(x,y)=2^{6S_1(p\,x,y)}$, corresponding to an adjustment up to +/−6 stops. The camera control system 302 finally clamps the result into k-bits:

$$I(x,y)=\min(2^k-1, T(L(x,y)\cdot E(x,y))). \quad (3)$$

For each of the $2^k$ display levels, camera control system 302 associates a threshold for acceptable visual distortion, modeled as a Gaussian noise:

$$\sigma_d:\{0,\ldots,2^k-1\}\Rightarrow \mathbb{R}^+.$$

In other words, the pixel value I(x,y) on display should have a standard deviation $\sigma_d(I(x,y))$ or less. This threshold depends on the viewing condition, display resolution, and the user's visual adaptation, but for a bright display (e.g., photopic vision), $\sigma_d$ is approximately constant for a given intensity level.

Then, assuming non-saturation, the camera control system 302 should use the metering algorithm to attempt to record each pixel's physical luminance L(x,y) so that each pixel's associated uncertainty $\sigma_w$, when carried through the imaging and tone mapping processes, has a standard deviation no larger than $\sigma_d(I(x,y))$. For sufficiently small uncertainty, the camera control system 302 can apply first order approximation to the tone mapping process to obtain, $$\frac{\sigma_w(x,y)}{\Delta L(x,y)} \approx \frac{\sigma_d(I(x,y))}{\Delta I(x,y)} \Rightarrow \sigma_w(x,y) \quad (4)$$
$$\approx \frac{\sigma_d(I(x,y))}{E(x,y)\cdot T'(L(x,y)\cdot E(x,y))},$$

via the chain rule, where T'(•) is the derivative of T(•) with respect to L.

Finally, the camera control system 302 assumes a c-bit linear camera that captures the scene and records raw pixel values:

$$p(x,y)=\min(2^c-1, L(x,y)\cdot t\cdot K+N(0;\sigma_r)), \quad (5)$$

where t is the exposure time; K is a calibration constant; $N(0;\sigma_r)$ is additive (e.g., Gaussian) read noise; and the camera control system 302 clamps the measurement to simulate saturation.

The camera control system 302 uses the HDR reconstruction algorithm to divide each pixel value by t·K to yield L(x,y), which also lowers the standard deviation of the noise to $\sigma_r/(t\cdot K)$. This noise should be below $\sigma_w(x,y)$ from Equation 4, providing a lower bound on the exposure time:

$$\frac{\sigma_r}{K}\cdot \frac{E(x,y)\cdot T'(L(x,y)\cdot E(x,y))}{\sigma_d(I(x,y))} \le t. \quad (6)$$

The camera control system 302 also enforces an upper bound to avoid sensor saturation:

$$t < \frac{2^c-1}{K\cdot L(x,y)}. \quad (7)$$

For pixels that saturate on the sensor, the estimate L(x,y) must be such that, when multiplied by E(x,y) and tone mapped, the result should saturate display. This gives an additional constraint $$t \le \frac{(2^c-1)E(x,y)}{K\cdot T^{-1}(2^k-1)}. \quad (8)$$

This analysis can easily be extended to handle nonlinear cameras by folding the inverse camera response function into T. The camera control system 302 can fold other sources of noise, such as photon noise, into the read noise by allowing $\sigma_r$ in Equation 6 to vary as a function of the pixel value.

The camera control system 302 can optimize the HDR stack. Now that the camera control system 302 has derived the necessary conditions on each pixel, the camera control system 302 can combine the required constraints to solve for a set of exposures that best satisfy constraints. Typically, a scene is handled by no more than 3 exposures, and most cameras offer only a limited number of possible exposure values.

FIGS. 6A-6C are diagrams of an example edit-based metering via per-pixel analysis, according to one embodiment of the present invention. For each pixel on the screen, the metering device 305 calculates the minimal and maximal permissible exposure values, accounting for the local and global transforms raw sensor values undergo.

FIG. 6A is a diagram illustrating an example case (a) of an edit-based metering via per-pixel analysis, according to one embodiment of the present invention. For metering, each pixel yields an objective function J(x,y,t) based on the minimum and maximum per-pixel exposure values $B_*(x,y)$ and $B^*(x,y)$.

FIG. 6B is a diagram illustrating an example case (b) of an edit-based metering via per-pixel analysis, according to one embodiment of the present invention.

FIG. 6C is a diagram illustrating an example aggregation of per-pixel objectives, according to one embodiment of the present invention. The camera control system 302 aggregates the per-pixel objectives into a single objective. This example illustrates an aggregation for a conventional tone mapping operator.

The camera control system 302 implements a greedy approach that seeks to iteratively maximize the aggregate objective function $\Sigma_{x,y}J(x, y, t)$ with respect to the exposure time t. The objective function should penalize exposure times outside the lower and upper bounds $B_*(x,y)$ and $B^*(x,y)$ derived at each pixel, using Equations 6-8, the camera control system 302 sets J=0. Otherwise, if the output pixel P(x,y) is saturated, the camera control system 302 favors shorter exposures. The camera control system 302 uses the objective function $$J(x, y, t) = \begin{cases} 0, & \text{if } t \notin [B_*(x, y), B^*(x, y)], \\ 1 + \alpha(x, y)\log_2 \frac{t}{B_*(x, y)}, & \text{otherwise,} \end{cases} \quad (9)$$

illustrated in FIGS. 6A and 6B on a logarithmic time axis, with α(x,y)=−0.3 if the pixel is saturated, and 0.0 otherwise.

When t is mapped to logarithmic domain, the objective in Equation (9) becomes a sum of piecewise-linear functions, which the camera control system 302 maximizes in linear time using dynamic programming, by pre-computing and caching the first- and second-order derivatives of the objective. The camera control system 302 greedily finds exposures that maximize the objective, terminating if the camera control system 302 reaches the maximum size of the stack or satisfies a certain percentage of per-pixel requirements, whichever occurs first. FIG. 6C illustrates the objective functions for two different tone mapping operators.

Edit-Based Camera Control: Stack Focusing for Display

Another popular target for manipulation is the depth of field. The camera control system 302 can use a conventional technique to combine a focal stack (e.g., a set of images focused at different depths) to simulate extended depth of field. The camera control system 302 can also reduce depth of field in a similar manner, or by using a conventional technique to perform image-space blurring. If the user can interactively specify the desired manipulation prior to capture and verify manipulation via visualization in the viewfinder, the camera control system 302 can use a conventional autofocus routine to deduce the minimal focal stack required for the composition, instead of capturing the full focal stack, which is expensive.

The camera control system 302 can quantifying a per-pixel focus requirement. Using the interface described above with reference to FIGS. 4A-4E, the user paints a mask F: $\{(x,y)\} \rightarrow [-1, 1]$ specifying, for example, which regions should be sharper or blurrier in a reference photograph focused at depth $z_0 \in [z_{min}, z_{max}]$. The camera control system 302 measures the depths in diopters. Under a simple conventional thin-lens model, the blur size changes linearly with the offset in diopters. Simultaneously, the viewfinder stream cycles through a number of focus settings to continuously acquire the scene at various depths and builds a rough depth map based on a local contrast measure. Using the per-pixel mask F, at F=0 the camera control system 302 uses the reference depth $z_0$. At 1, the camera control system 302 uses the maximally sharp depth $z_0$. At −1, the camera control system 302 uses the maximally blurred depth at the pixel (either $z_{min}$ or $z_{max}$, whichever would cause the formula to interpolate away from $z_*$); at other values the camera control system 302 linearly interpolates:

$$\hat{z} = |F| \cdot z_t + (1-|F|) \cdot z_0, \quad (10)$$

where $z_t$ is $z_*$ if F≥0 and $z_{ext}$ otherwise.

After $\hat{z}$ is regularized with a cross-bilateral filter using the scene image, the camera control system 302 obtains the synthesized scene by sampling from the appropriate slice of the focal stack at each pixel. When the appropriate depth is not available, the camera control system 302 interpolates linearly from the two nearest slices. The camera control system 302 updates the viewfinder with the synthetic image continuously.

The camera control system 302 can optimize the focal stack. The map $\hat{z}$ obtained in the previous section covers a continuous range of depths, which is impractical to capture. To discretize $\hat{z}$ into a few representative values, the camera control system 302 reuses the framework described with reference to Equations 3-9 for optimizing the sum of piecewise-linear functions. The per-pixel objective is 1 at the desired depth $\hat{z}(x,y)$, linearly reducing to zero at depth error $\epsilon$ (the camera control system 302 uses $\epsilon=1.0$ for a lens with depth range of 0.0≈10.0 diopters):

$$J(x, y, z) = \max\left(0, \frac{\epsilon - \|z - \hat{z}(x, y)\|}{\epsilon}\right). \quad (11)$$

The camera control system 302 aggregates this per-pixel objective over all pixels under consideration on the viewfinder. Because Equation 11 is piecewise linear, the camera control system 302 can optimize the aggregate objective quickly as described with reference to Equations 3-9. Once again, the camera control system 302 greedily selects focus distances that maximize the objective, stopping when the camera control system 302 orders 10 slices or if for most of the pixels $\hat{z}$ is close to one of the focus distances in the set.

One embodiment of the invention may be implemented as a program product for use on a computer system, such as the camera system 100 of FIG. 1 for example. One or more programs of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for generating an image for display on a camera device, the method comprising:
   receiving an input via a user interface device that displays an image of a scene at which a camera lens of the camera device is pointing, wherein the input is associated with a selection region of the user interface device;
   generating an edits mask based on a plurality of matching image patches, which are based on the input and a high dynamic range (HDR) image generated by the camera device, wherein each matching image patch included in the plurality of matching image patches corresponds to a different image frame included in a set of sequential image frames of the scene;
   performing a tone mapping operation based on the edits mask and the HDR image in order to generate a tone mapped HDR image; and performing a metering operation based on the edits mask and the tone mapped HDR image in order to generate metering parameters for subsequent frame capturing operations.

2. The method of claim 1, further comprising transmitting the tone mapped HDR image to the user interface device for display.

3. The method of claim 1, wherein the metering operation comprises:
   quantifying metering requirements based on the edits mask and the tone mapped HDR image;
   metering the tone mapped HDR image to calculate metering parameters; and
   providing to the camera device the metering parameters that affect the subsequent frame capturing operations for generating the HDR image.

4. The method of claim 1, wherein each matching image patch included in the plurality of matching image patches includes a subset of pixels included in the selection region of the corresponding image frame.

5. The method of claim 1, wherein generating the edits mask comprises:
   processing a sub-sampled set of image patches to generate an intermediate image mask; and
   performing an edge-aware up-sampling operation on the intermediate mask based on a domain transform with respect to an edge of an object in image frames captured via the camera lens.

6. The method of claim 5, wherein the edge-aware up-sampling operation provides data to a processor that, in response, performs operations at a higher rate relative to operations prior to the edge-aware up-sampling operation.

7. The method of claim 5, wherein the edge-aware up-sampling operation provides data to a processor that enables the processor to distinguish between a texture associated with the object and a texture associated with another part of the scene.

8. The method of claim 1, wherein the high dynamic range image is generated by blending image frames of a sliding window, wherein the sliding window includes, at a first time, a first sequence of two or more adjacent image frames captured via the camera lens.

9. The method of claim 8, wherein the sliding window includes, at a second time, a second sequence of two or more adjacent image frames captured via the camera lens.

10. The method of claim 1, wherein the scene is a live scene that includes objects that are moving.

11. A non-transitory computer-readable storage medium including instructions that, when executed by a processor, cause the processor to generate an image for display on a camera device, by performing the steps of:
   receiving an input via a user interface device that displays an image of a scene at which a camera lens of the camera device is pointing, wherein the input is associated with a selection region of the user interface device;
   generating an edits mask based on a plurality of matching image patches, which are based on the input and a high dynamic range (HDR) image generated by the camera device, wherein each matching image patch included in the plurality of matching image patches corresponds to a different image frame included in a set of sequential image frames of the scene;
   performing a tone mapping operation based on the edits mask and the HDR image in order to generate a tone mapped HDR image; and
   performing a metering operation based on the edits mask and the tone mapped HDR image in order to generate metering parameters for subsequent frame capturing operations.

12. The non-transitory computer-readable storage medium of claim 11, further comprising transmitting the tone mapped HDR image to the user interface device for display.

13. The non-transitory computer-readable storage medium of claim 11, wherein the metering operation comprises:
   quantifying metering requirements based on the edits mask and the tone mapped HDR image;
   metering the tone mapped HDR image to calculate metering parameters; and
   providing to the camera device the metering parameters that affect the subsequent frame capturing operations for generating the HDR image.

14. The non-transitory computer-readable storage medium of claim 11, wherein each matching image patch included in the plurality of matching image patches includes a subset of pixels included in the selection region of the corresponding image frame.

15. The non-transitory computer-readable storage medium of claim 11, wherein generating the edits mask comprises:
   processing a sub-sampled set of image patches to generate an intermediate image mask; and
   performing an edge-aware up-sampling operation on the intermediate mask based on a domain transform with respect to an edge of an object in image frames captured via the camera lens.

16. The non-transitory computer-readable storage medium of claim 15, wherein the edge-aware up-sampling operation provides data to a processor that, in response, performs operations at a higher rate relative to operations prior to the edge-aware up-sampling operation.

17. The non-transitory computer-readable storage medium of claim 15, wherein the edge-aware up-sampling operation provides data to a processor that enables the processor to distinguish between a texture associated with the object and a texture associated with another part of the scene.

18. The non-transitory computer-readable storage medium of claim 11, wherein the high dynamic range image is generated by blending image frames of a sliding window, wherein the sliding window includes, at a first time, a first sequence of two or more adjacent image frames captured via the camera lens.

19. The non-transitory computer-readable storage medium of claim 18, wherein the sliding window includes, at a second time, a second sequence of two or more adjacent image frames captured via the camera lens.

20. A camera control system, comprising:
   a mask generator device configured to:
      receive an input via a user interface device that displays an image of a scene at which a camera lens of a camera device is pointing, wherein the input is associated with a selection region of the user interface device, and
      generate an edits mask based on a plurality of matching image patches, which are based on the input and a high dynamic range (HDR) image generated by the camera device, wherein each matching image patch included in the plurality of matching image patches corresponds to a different image frame included in a set of sequential image frames of the scene; and
   a metering device configured to:
      perform a tone mapping operation based on the edits mask and the HDR image in order to generate a tone mapped HDR image, and perform a metering operation based on the edits mask and the tone mapped HDR image in order to generate metering parameters for subsequent frame capturing operations.

21. The method of claim MN, further comprising increasing a quantity of image frames included in the sliding window based on a parameter associated with the edits mask.

22. The method of claim 1, wherein the parameter is a brightness value associated with the edits mask.

* * * * *